Jan. 4, 1966     P. N. RENZI     3,227,429
MASS TRANSFER PACKING

Filed Feb. 4, 1963     4 Sheets-Sheet 1

INVENTOR
Peter N. Renzi

BY *Tenner J. Erstad*
ATTORNEY

Jan. 4, 1966 P. N. RENZI 3,227,429
MASS TRANSFER PACKING
Filed Feb. 4, 1963
4 Sheets-Sheet 2
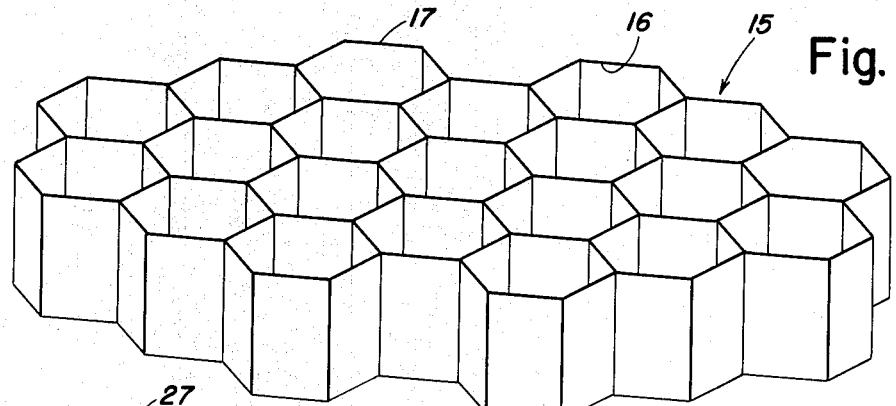
Fig. 7.
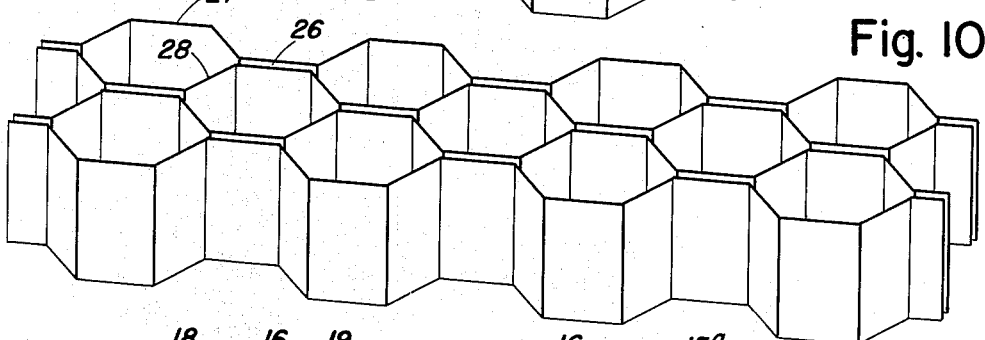
Fig. 10.
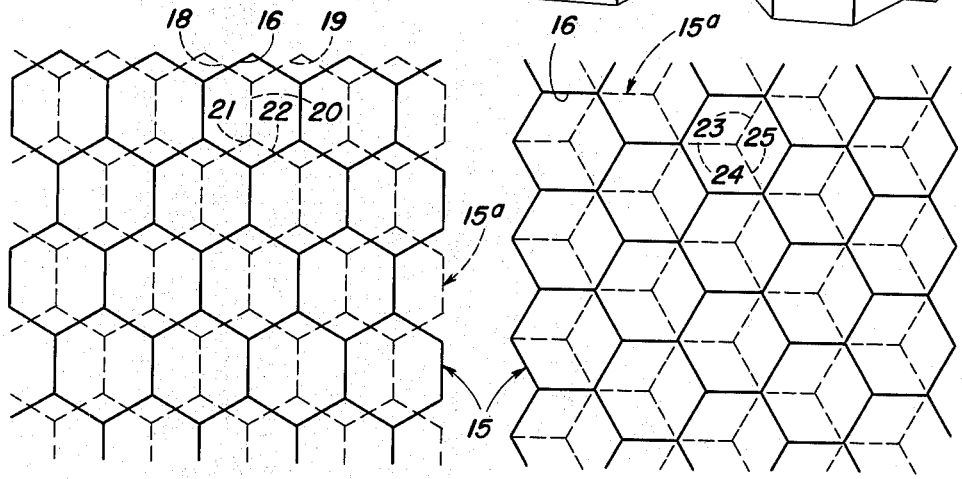
Fig. 8.
Fig. 9.
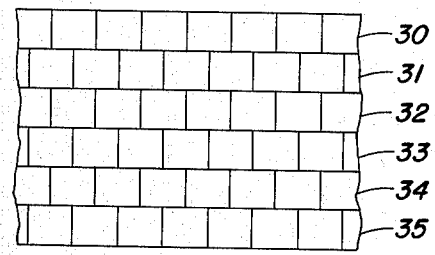
Fig. 11.
INVENTOR
Peter N. Renzi
BY Tennes J Erstad
ATTORNEY Jan. 4, 1966 P. N. RENZI 3,227,429
MASS TRANSFER PACKING
Filed Feb. 4, 1963 4 Sheets-Sheet 3

INVENTOR
Peter N. Renzi
BY
ATTORNEY

Jan. 4, 1966  P. N. RENZI  3,227,429
MASS TRANSFER PACKING
Filed Feb. 4, 1963

INVENTOR
Peter N. Renzi

BY
Tenner J Erstad
ATTORNEY

United States Patent Office 3,227,429
Patented Jan. 4, 1966

3,227,429
MASS TRANSFER PACKING
Peter Nicholas Renzi, Mountainside, N.J., assignor to American Radiator & Standard Sanitary Corporation, New York, N.Y., a corporation of Delaware
Filed Feb. 4, 1963, Ser. No. 255,952
1 Claim. (Cl. 261—112)

This application is a continuation-in-part of my copending application Serial No. 39,266 filed June 28, 1960, and now abandoned.

This invention relates to mass transfer packing used to facilitate contact between two or more fluid mediums to effect a change in at least one of the fluid mediums. The packing of the present invention may, for example, be used for mixing, heat exchanging, humidifying, dehumidifying, air scrubbing, air washing, filtering, aerating, oxygenation, diffusion, removal of solid matter and/or undesired gaseous constituents, absorption of gases in liquids, absorption reaction, distillation, cooling, rectification, chemical reactions in which intimate contact between two fluids is desirable, and numerous other applications where changes are effected to a fluid by at least one other fluid as masses thereof are brought into contact with one another.

The uses of the packing of the present invention are not limited to the applications listed above since, as will become evident from the following description, the principles of the present invention are broadly applicable to other mass transfer applications ranging, for example, from simple humidification of air by contact with water to processes where multicomponent gases contact complex liquids as in fractional distillation apparatus.

The greater complexity of mass transfer phenomena has obscured some of the basic principles of good mass transfer packing designs. This is amply illustrated by the myriad forms such packings have taken. Some known prior art designs provide means for breaking a liquid into fine droplets by promoting splashing of the liquid while other designs seek to achieve liquid hold-up in the interstices formed between packing elements. Mass transfer packings have been made, for example, in the form of hollow cylinders, saddle shaped elements, and in some cases, crushed rock has been used.

In designing mass transfer packings, it is generally desirous to achieve intimate contact of two fluids by allowing the fluids to flow simultaneously over the packing elements. It is also desirous to minimize the size and weight of the packing and to minimize the energy required to move the fluids over the packing surfaces.

It is a well known principle that heat transfer between fluids can be accomplished in an efficient manner if energy is dissipated in the form of "skin friction" rather than eddies or turbulence in the main body of the fluids. Therefore, by analogy, based on this principle, an efficient mass heat transfer packing would be one in which the pressure drop due to skin friction is relatively high compared to that due to turbulence.

One way of achieving such an objective is to provide a packing composed of a multiplicity of small diameter passages. However, where liquid and gas media are used, for example, it is necessary to prevent liquid hold-up due to capillary effects on the liquid in the small passages. Such liquid hold-up would result in increased pressure drop in forcing gas to flow through the packing with little or no increase in performance. This liquid hold-up may be caused, for example, by the tendency of the liquid to form a meniscus which would tend to plug or bridge the small openings.

However, the desired objectives of efficient-flow energy utilization and compactness by utilizing skin friction energy to promote mass transfer and heat transfer in packings can be achieved with large cells without sacrificing compactness if means for promoting high mass transfer in compact packings composed of large cells are used.

This can be done by taking advantage of the high mass tarnsfer and heat transfer rates which exist at the leading edges of flow passages. Thus, if a large number of short parallel flow passages are provided in a packing to provide a larger number of leading edges, a compact packing will result.

The leading edges function to interrupt the flow stream in each passage to thereby produce regions of high mass transfer at each flow interruption. In these regions the boundary layer, that is the layer of gas adjacent to the surface in which the velocity varies from zero at the surface to nearly the main stream velocity, is thin in comparison to regions far from such a disturbance. Mass transfer and heat transfer is improved by making this boundary layer as thin as possible which, of course, can be accomplished by having a multiplicity of such interruptions or leading edges. In the regions where the boundary layer is developing, mass transfer and heat transfer rates are high, and although the pressure drop per unit length is also high, the ratio of mass transfer to pressure drop remains approximately the same as for fully developed flow. Hence the better utilization of surface results in a smaller packing volume to perform a given task at essentially no penalty in pressure loss.

An efficient and compact packing for mass transfer applications can be designed by taking advantage of the high transfer rates that occur at the leading edges of flow passages by aligning the packing elements in the direction of gas flow to minimize form drag and turbulence.

Accordingly, it is an object of this invention to provide a mass transfer packing in which friction energy is efficiently utilized to promote mass transfer.

Another object is to provide a mass transfer packing having a plurality of passages wherein there is no fluid hold-up due to capillary effects of the fluid being handled by the packing.

Another object is to provide a mass transfer packing in which means are provided to promote dissipation of energy due to "skin friction" rather than due to turbulence.

Another object is to provide a packing which is light, compact, inexpensive, and which provides a maximum mass transfer per unit volume.

Another object is to provide a packing which utilizes a plurality of leading edges to provide efficient mass transfer.

Another object is to provide a packing which will require a minimum amount of power to force fluids through the packing.

Another object is to provide a packing which may be used in a cooling tower, an air washer cell for air purification, a trickle filter for waste treatment, an economizer for heat recovery, a gas scrubber for fume or particle removal, a gas-liquid contactor for chemical processing, and for other mass transfer or heat transfer applications.

Other objects and features of the invention will appear as the description of the particular physical embodiment selected to illustrate the invention progresses.

For a better understanding of the present invention reference should be had to the accompanying drawings, wherein like numerals of reference indicate similar parts throughout the several views and wherein:

FIGURE 7 is a schematic and perspective representation of one layer of a modified mass exchange packing arranged as a honeycomb.

FIGURE 8 is a plan view of two layers of packing of the type shown in FIGURE 7 stacked one above the other and showing the staggered or offset arrangement between the two layers.

FIGURE 9 is similar to FIGURE 8 but shows a different staggering or offset arrangement.

FIGURE 10 is a schematic perspective view of a section of machine-made honeycomb.

FIGURE 11 is a side elevation of several layers of packing arranged in staggered or offset array one above the other.

With reference to the drawings, FIGURES 1 to 4, it can be shown that the length of the heat transfer passages in packings composed of parallel small diameter passages can be reduced by reducing the size of the individual passages without changing the pressure loss. The various relationships between heat transfer passage size, and pressure drop will be described to establish a basis for understanding the principles of compact heat transfer packings and, by analogy, compact mass transfer packings.

Figure 1:
FIGURES 1 to 4 are schematic representations of conduits included herein to illustrate certain theories of heat and mass exchange.
Figure 2:
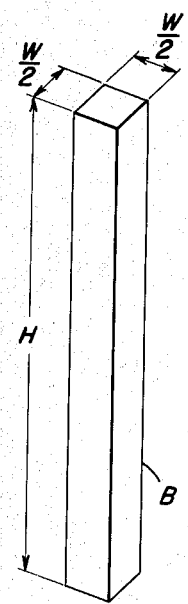
Figure 3:
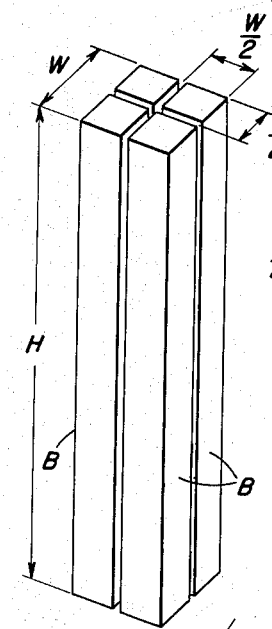

Consider two flow passages A and B of square cross-section as shown in FIGURES 1 and 2, the first, (A), having sides which are twice the width of the second, (B). Although square sections are used here, any shape opening can be used as long as the sections compared are geometrically similar.

The hydraulic diameter for flow in such passages is equal to the width of a side in each case. The surface area is $4 \times W \times H$ for the larger flow passage A where W represents the width of the passage A and H the axial length. Four passages B–1 of the smaller size B could occupy the same volume as the larger flow passage A and would have a surface area equal to $8 \times W \times H$. Since the heat transfer coefficient (C) in laminar flow is inversely proportional to the hydraulic diameter, the amount of heat that can be transferred per unit area in each small passage B is twice that in a large passage A for the same temperature difference. Since the four smaller passages B–1 provide twice as much surface area per unit volume as seen from FIGURE 3, it follows that four times as much heat can be transferred. However, pressure drop is inversely proportional to the square of passage diameter in laminar flow which means the four small passages B–1 will have four times the pressure loss of the large passages A.

Figure 4:
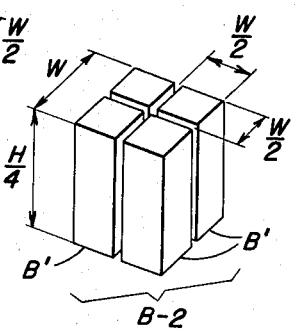

By reducing the length of the small passages B to one-fourth the length of the large passage A, such reduced length passages being indicated as B′, as shown in FIGURE 4, both heat transferred and pressure drop will be equal in the large passage A and the four small passages B′ which are indicated collectively as B–2. Furthermore, the actual heat transfer surface in the four small passages B–2 will be only half as much as for the large passage A. This, then, points out the advantages in compactness which can be achieved with packings composed of a multiplicity of small diameter passages. As explained earlier, liquids will tend to load in very small cells thus increasing the power required to force gas through the packing. Also, as explained earlier, the same advantages of efficient heat and mass transfer may be achieved with large (non liquid-loading) cells if means for promoting high heat and mass transfer are provided in such packings composed of large cells.

Such a packing arrangement may be obtained by utilizing a plurality of cellular structures arranged in staggered layers one above the other. Such an arrangement will offer a plurality of leading edges and will better utilize the packing surfaces resulting in a smaller packing volume to perform a given task at essentially no penalty in pressure loss.

Figure 5:
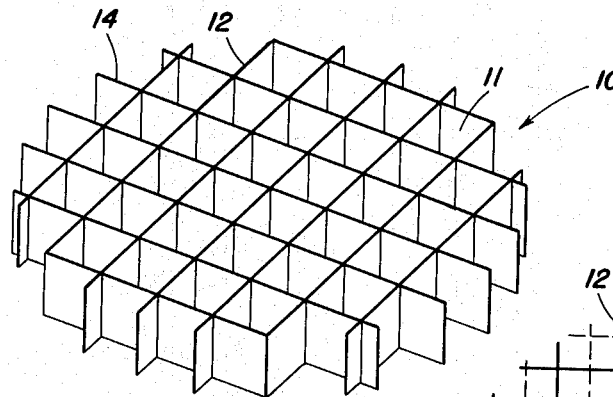
FIGURE 5 is a schematic and perspective representation of one layer of mass exchange packing according to one embodiment of the invention.

FIGURE 5, for example, illustrates a cellular structure 10 comprising two series of intersecting strips of material defining a plurality of generally parallel cells or conduits such as the one shown at 11. One series of strips such as the series containing the strip 12 extends at a suitable angle, 90 degrees for example, with respect to the other series of strips such as the series containing the strip 14. The strips in the cellular structure 10 are suitably secured or interlocked so that such structure can be handled as a unit. Means for interlocking such strips may comprise suitable transverse slots extending from opposite longitudinal edges of intersecting strips such that the slots engage each other to provide a cellular structure having a uniform height throughout equal to the width of each strip. Suitable adhesion means may be provided at such intersections if desired.

A plurality of such cellular structures 10 are stacked one upon the other in a manner to provide a plurality of leading edges for the fluids passing through the stack.

Figure 6:
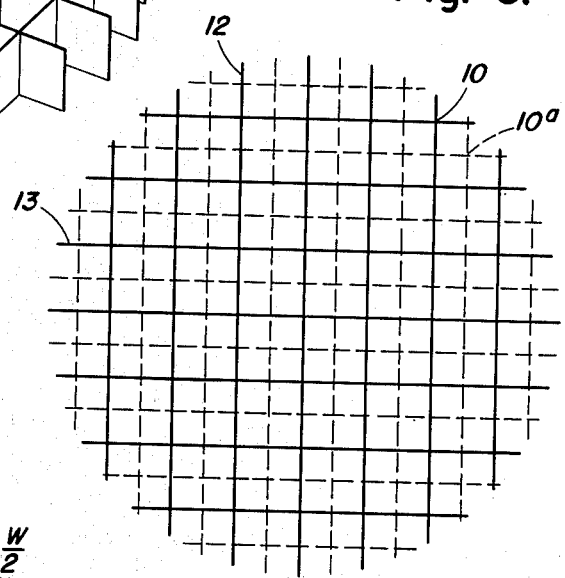
FIGURE 6 is a plan view of two layers of packing of the type shown in FIGURE 5 stacked one above the other and showing the staggered or offset arrangement between the two layers.

FIGURE 6 illustrates how one layer 10 (in solid lines) is staggered relative to the layer 10a (in broken lines) such that after a fluid passes through the cells or conduits 11 in layer 10 such fluid will encounter the plurality of leading edges in layer 10a. Although only two layers are shown in FIGURE 6, any number of layers may be stacked as required with the layers staggered to present a multiplicity of leading edges as fluid transits from one layer to a succeeding layer.

FIGURE 7 illustrates a cellular structure arranged with hexagonal cells 16 such as a honeycomb. This particular type of geometry offers the advantage that it can be inexpensively mass produced by machine. The cells or conduits 16 (FIGURE 7) are generally parallel to one another and are defined by a plurality of integral or secured intersecting walls such as the wall 17 such that the honeycomb structure 15 may be handled as a unit. A plurality of these units are stacked upon one another in layers in a suitable staggered array to present a plurality of leading edges to a fluid as it transits from one unit or layer to another.

The staggering may be accomplished by off-setting succeeding layers such as shown in FIGURE 8, for example, wherein a fluid leaving cell 20 of layer 15 will encounter leading edges 18, 19, 20, 21, 22 of a succeeding layer 15a. Similarly, FIGURE 9 shows a different staggered or offset arrangement wherein a fluid leaving cell 16 of layer 15 will encounter leading edges 23, 24, 25, of a succeeding layer 15a.

FIGURES 8 and 9 illustrate a regular pattern of staggered offset. However, the objective of providing a plurality of leading edges may be achieved by offsetting or staggering in any suitable fashion such as by rotating adjacent layers to various angles, 60 or 90 degrees for example, relative to one another. Also, succeeding layers may be arranged by a combination of offset and rotation as desired.

FIGURE 10 illustrates a section of machine-made honeycomb made from a suitable material, such as paper, for example, wherein the nodes 26 of adjacent strips such as strips 27 and 38 are secured to one another, such as by adhesive. When arranged in layers in a stack, each layer of machine-made honeycomb may be arranged with the node or glue lines 26 in one layer running at a right angle to the node or glue lines in adjacent layers thus insuring non-alignment of cells in adjacent layers as desired in accordance with the description set forth.

It will be noted that the bonded face areas 26 in the strip pairs formed by strips 27 and 28 are parallel with the bonded face areas in all other strip pairs. However the bonded face areas in adjacent strip pairs are staggered on opposite sides of imaginary horizontal lines running normal to the general directions taken by the strips; thus the bonded face areas 26 between strips 27 and 28 are staggered with respect to the bonded face areas between strip 28 and the strip immediately in front thereof. The unbonded face areas of the strips are of course acutely angled from the bonded face areas to form the hexagonal passage configurations.

As shown in FIGS. 8 and 9, the strip walls in adjacent cell structure layers are out of planar alignment with one another so that all of the strip edges in each layer are exposed to the fluids passing through the packing.

FIGURE 11 illustrates schematically the arrangement of layers of cellular structures 30, 31, 32, 33, 34, 35 one above the other in staggered array. Each layer contacts adjacent layers while the total number of layers depends on the specific application of use.

The square and hexagonal cells illustrated in the drawings are two types of geometry which may be used. As the description proceeds it will become apparent to those skilled in the art that other types of geometric arrangements may be used to achieve the same objectives.

Having described several embodiments of the packing of the present invention a few specific examples of its application will now be set forth.

Figure 12:
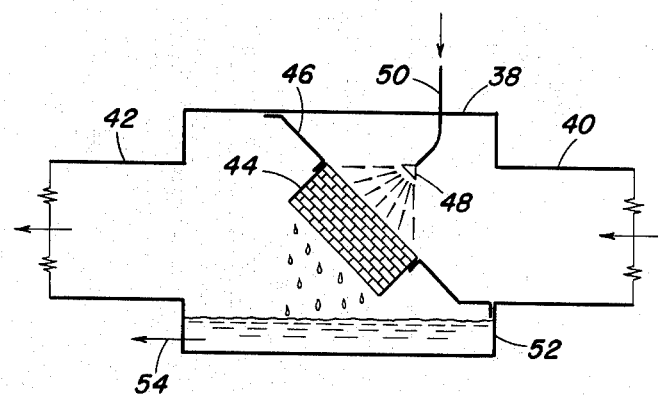
FIGURE 12 is a schematic representation of an air washer in which the packing of the present invention is used.

FIGURE 12 illustrates the use of the packing of the present invention in an air washer for removing solid matter and/or undesirable gaseous constituents from air. Air washers may be used, for example, for conditioning and cleaning air in air-conditioning systems. In such an application air passes through a fill or packing in contact with water whereby the air is either humidified or dehumidified depending upon its initial humidity and the water temperature. The air is also cleaned of dust and other particulate matter and further cleaned of odors in the forms of absorbable (in water) gases.

It is an objective of good packing design for this application to achieve the maximum efficiency of humidification, particulate matter removal and gas absorption with the least amount of packing material and air flow pressure loss to achieve both low initial and operating costs together with high efficiency. Accordingly, a good fill or packing must be constructed from inexpensive substances, be resistant to deterioration by water, effect high humidity transfer from air to or from water, act as a good particle scrubber and good gas scrubber, and exhibit low air flow pressure drop.

FIGURE 12 illustrates the use of the packing of the present invention in an air washer which comprises a casing 38 supplied with and discharged of air through the air inlet duct and air outlet ducts 40 and 42 respectively.

A packing stack 44 comprising layers of packing constructed and arranged according to the manner heretofore described is arranged in said housing 38 intermediate said air inlet and outlet ducts. The packing stack 44 is shown as being supported by a support baffle 46 such that the air passing through the casing 38 will flow through the packing stack. The packing stack may be arranged in any convenient manner within the casing such as with the cells arranged vertically, horizontally or at an inclination relative to the general flow path of the air as shown in FIGURE 12.

Mounted at the inlet of the packing stack 44 is a spray nozzle 48 suitably supplied with water by a supply conduit 50. The spray nozzle 48 sprays water onto the packing stack 44 so that as the water and air pass therethrough, the air is washed. The clean and conditioned air flows out of the air outlet duct 42, while the water dripping from the packing stack 44 is collected in a sump 52 therebeneath. A water outlet conduit 54 prevents the sump 52 from flooding.

In addition to removing undesirable constitutents such as dust and fumes, for example, the air washer may also be used to humidify or dehumidify the air. For humidification, means may be provided for recirculating the water through a cycle comprising the spray nozzle 48, packing stack 44, sump 52, pumping means (not shown), and back to the spray nozzle 48. For dehumidification chilled water may be sprayed into the packing stack 44.

It will now be shown how the objectives desired to be achieved in an air washer are obtained to the maximum degree with minimum pressure drop in the present invention even though the mechanisms governing humidification and dehumidification, particle removal and gas absorption are not identical. For example, the action of heat and moisture transfer in air humidification and dehumidification is analogous to simple heat transfer processes. In the latter, heat transfer is improved by flowing the air over a surface having a multiplicity of interruptions or discontinuities.

Further, if said discontinuities are aligned with the air or gas flow, no eddies or turbulence in the main body of flow will be generated due to bluff body effects, the latter condition not aiding heat transfer substantially but materially adding to pressure loss. Since heat and moisture transfer processes are both controlled by the resistance to diffusion from the solid (or liquid) surface to or from the bulk air stream, it is clear that a good heat transfer surface should be a good moisture transfer surface.

In the packing of the present invention, a multiplicity of layers of cellular structures are stacked one upon another with the cells in each layer offset from the cells in the layers immediately above or below. In this manner new leading edges exist at each layer to interrupt the gas flow and effect high heat mass transfer rates.

It will now be shown that this packing concept which is an effective one for heat and mass transfer, is also an effective one for particle collection. The collection of particles above approximately 1 micron, is generally achieved by inertial separation of these particles from the air or gas stream. The packing of the present invention is ideally suited for this mechanism since the air is forced to turn slightly at each leading edge. As a result the particles, by virtue of their greater inertia, continue onward in nearly straight lines to strike and adhere to the liquid coated packing element.

Below approximately 1 micron inertial collection becomes insignificant and diffusion of particles becomes more important. Here the process is similar to the diffusion of water vapor and, again, the packing of the present invention proves to be an effective collector.

It will further be shown that this packing concept is also effective for removal of absorbable gases. When a gas is absorbed in a liquid, it diffuses through the liquid at a rate characteristic of the liquid-gas combination (assuming molecular diffusion only and no liquid agitation). If the gas has a low diffusivity in the liquid it will very quickly saturate the liquid surface and absorption of the gas from the bulk gas stream will be slowed down substantially.

To improve this situation, it is advantageous to enhance the diffusion through the liquid film by agitating said film thereby preenting fresh (unsaturated) liquid surfaces to the gas. This is accomplished with great effectiveness in the packing of the present invention since the liquid is "stirred" each time it flows from one leading edge to the next in its passage through the packing thus presenting unsaturated liquid to the gas at each level. This in combination with the enhanced gaseous diffusion in the gas due to the leading edge effect described earlier combine to make this packing an effective absorber.

The objective of inexpensive fill material or packing is met by making the packing of the present invention with a suitable inexpensive material such as paper suitably coated or impregnated such as with a plastic resin. The surface of such paper may be made wettable such as to produce a "blotter" effect and will thereby insure liquid film formation. Furthermore, in the case where the packing is made of honeycomb structures, it can be fabricated to the desired geometry by inexpensive mass production technique.

Thus the use of the packing of the present invention with thin wall open cellular passages arranged in layers with passages offset from one layer to the next will achieve in combination, high rates of heat and moisture transfer, particle collection and gas absorption with minimum air (or gas) flow pressure drop.

The improvement of performance for each of the important factors in air washing, i.e., moisture transfer, particle removal, gas absorption can be achieved by changing (making as short as practical) the dimension of said cellular material in the direction of air flow.

In FIGURE 12 the air and water flow co-currently in the same general direction through the packing stack 44, but if desired, the direction of flow of either the water or air through the packing stack may be reversed to provide counter-curent flow.

Figure 13:
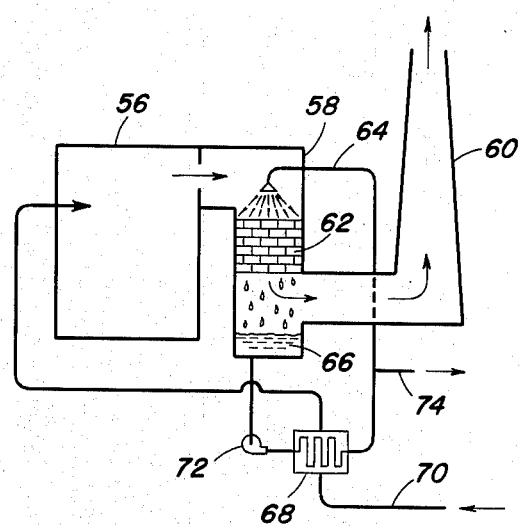
FIGURE 13 is a schematic representation of an economizer in which the packing of the present invention is used.

Another example of the use of the packing of the present invention is in an economizer. In such an application the packing may be used as a combination gas scrubber and heat recovery device. FIGURE 13, for example, illustrates schematically a boiler 56 and a duct 58 for conducting the hot flue gases to a stack 60. A packing stack 62 constructed and arranged according to the present invention is installed in the duct 58 such as in the vertically extending portions such that the hot flue gases will pass through the layers of packing. Fluid, such as water, is supplied to the top of the packing stack 62 by the conduit 64 and suitably distributed thereover. The fluid falling from the packing is collected in an underlying sump 66 in the duct 58. As the fluid and hot flue gases pass through the packing, the flue gases will be scrubbed of absorbable gases and dust as well as cooled.

The liquid, which is heated as it passes through the packing, may be passed through a heat exchanger 68 where the heat is recovered such as, for example, by exchanging heat with the water being supplied to the boiler through the boiler feed conduit 70. After passing through the heat exchanger 68 the liquid from the sump 66 is recirculated back through the conduit 64 to the top of the packing by suitable means such as a pump 72. Suitable means indicated schematically at 74 are provided to purge the fluid in the conduit 64 of the impurities scrubbed from the flue gases before the fluid is returned to the top of the packing stack. The hot flue gases and fluid may also flow co-currently instead of counter-currently as illustrated.

Figure 14:
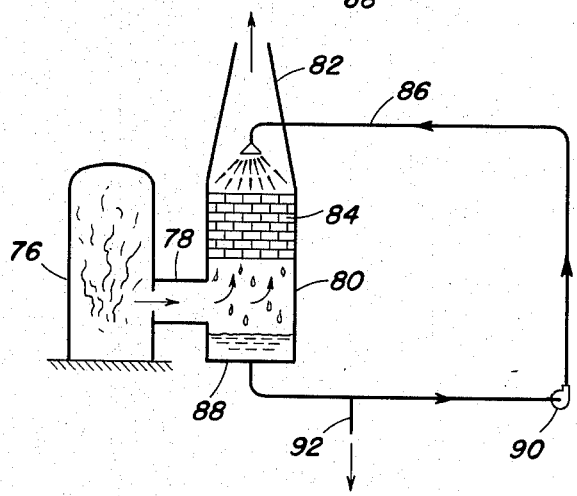
FIGURE 14 is a schematic representation of a fume scrubber or particle remover device in which the packing of the present invention is used.

FIGURE 14 schematically illustrates the use of the packing of the present invention in a gas scrubber for fume removal. Fumes passing from a fume producing process 76 flow through a duct 78 to a connecting duct 80 or stack 82 containing stacked layers of packing 84. The fumes pass through the stack 82 while water supplied by the conduit 86 is distributed at the top of the packing 84 to flow counter-currently therethrough to be collected in an underlying sump 88. The fluid is recirculated by suitable means such as the pump 90 while means indicated schematically at 92 are provided to purge the fluid of impurities gathered in the transit through the packing 84. Any suitable liquid which will absorb the objectional gaseous components may be used. The gaseous components may go into solution or react chemically with the liquid. Alternatively, the gases may flow downwardly to provide co-current flow.

The arrangement described and illustrated with reference to FIGURE 14 may also be used as a gas scrubber for particle removal. In such a case, any suitable liquid which will keep the packing elements washed clean may be used.

Figures 15, 17:
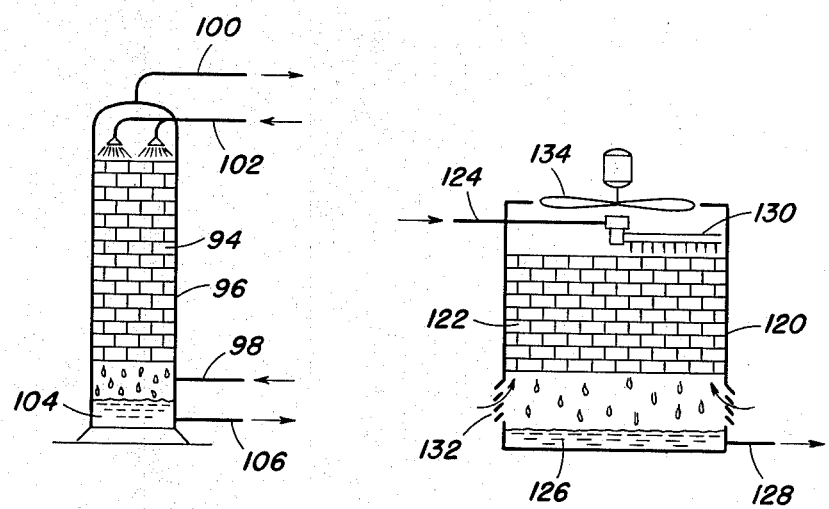
FIGURE 15 is a schematic representation of a gas-liquid contactor for chemical processing in which the packing of the present invention is used.
FIGURE 17 is a schematic representation of a trickle filter in which the packing of the present invention is used.

FIGURE 15 illustrates schematically the use of the packing of the present invention in a gas-liquid contactor for chemical processing wherein a packing stack 94 is shown arranged in a tower 96. A gas containing component X is introduced into the tower 96 by the conduit 100 after having passesd through the packing stack 94. A liquid is introduced through the conduit 102, distributed over the packing 84 and collected in the sump 104 to be discharged through the conduit 106. In passing through the packing stack 94 the mixing of the gas and liquid will transfer the undesirable component X from the gas to the liquid. Here again, the gas flow may be downward for co-current flow.

Figure 16:
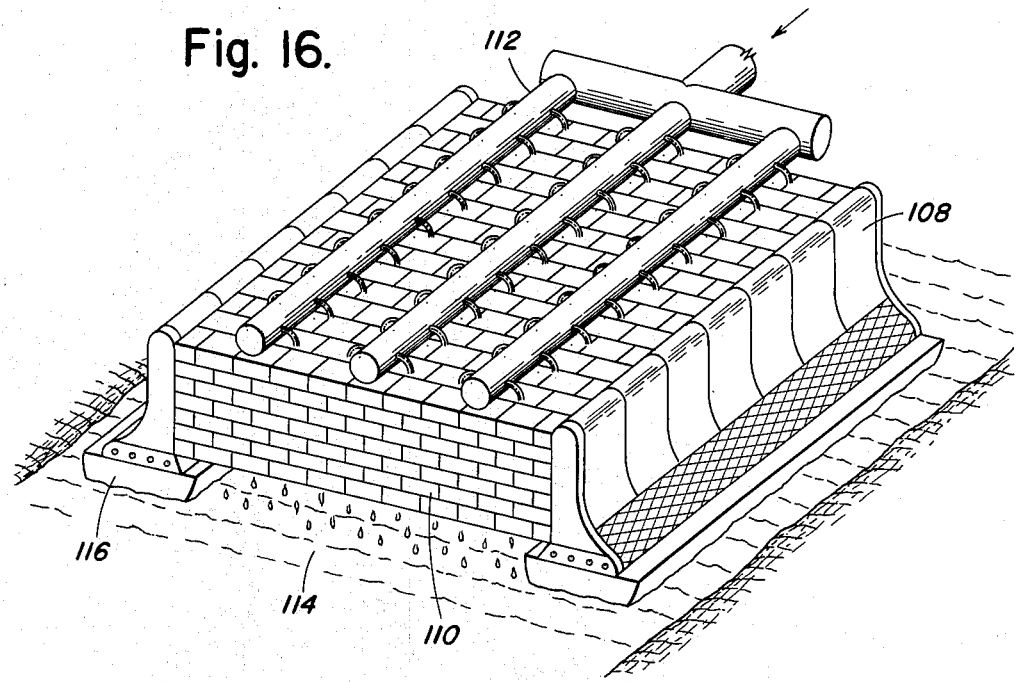
FIGURE 16 is a schematic representation of a device to aerate water in which the packing of the present invention is used.

FIGURE 16 schematically illustrates the use of the packing in a device to aerate rivers, streams, and other large bodies of water. The operation of the device is similar to the operation of the devices previously described. As shown in the drawing, a housing 108 supports the packing stack 110 while the water to be aerated is distributed over the packing stack by suitable means such as the perforated pipes 112. The water is aerated as it passes through the packing 110 and falls or returns to the river or other large body of water 114.

As an example of operation, a total flow of about 10,000 gallons per minute of nearly de-oxygenated water can be nearly saturated with a packing about 40 feet wide by 100 feet long by 2 feet high. Lesser flows would require proportionately smaller packing. The housing 108 containing the packing 110 may be built on a barge or floating structure such as the pontoons 116 so that water picked up from a river by pumps (not shown) would be delivered to the top of the packing 110 and would cascade through the packing 110 becoming oxygenated in the process.

Another application of the packing of the present invention is in the production of vitamins. Certain vitamins such as B-2 and B-12 are made by aerating a culture of a certain type bacteria growing in a specific liquid mixture. Conventionally, the operation is a batch process. The process is started by "seeding" large tanks of the liquid with small bacteria cultures and waiting for these cultures to multiply in number. The bacetria feed upon the liquid nutrients and convert some components into the desired vitamin. The operation is stopped when a sufficient concentration of vitamin is reached. The mixture is then concentrated by evaporation, filtration, or other suitable process to recover the vitamins.

According to the present inevntion, this process is made continuous rather than a batch process by having the bacteria grow on a packing, constructed and arranged according to the present invention over which the nutrient liquid trickles. By providing and maintaining proper aeration and nutrient conditions, the bacetria would be ever present in the right numbers and would continuously convert some of the nutrient material to the desired vitamin. Part of the recycling nutrient (recycling through the packing) would be continuously withdrawn for extraction of the vitamins.

FIGURE 17 illustrates the use of packing of the present invention in a trickle filter for waste treatment. Advancements in chemical technology have produced many new products which require different methods of manufacturing such as: washing, extracting, impregnating, and flushing operations which will in turn, produce a large number of spent process waters. These liquid effluents contain suspended colloidal material, dissolved mineral and organic substances and settable solid particles. A large percentage of these materials can be neutralized or taken out of solution by the action of bacterial organisms. Such biological treatment is usually applied to materials which possess what is termed a Bio-chemical Oxygen Demand, abbreviated B.O.D. If wastes possessing a high B.O.D. are discharged into a river or other body of water the micro-organisms in the water will "feed" upon the waste material and, at the same time, draw dissolved oxygen from the water for respiratory purposes. If sufficient oxygen is present in the water, the waste will be converted into simple, non-toxic substances as carbon dioxide, water, nitrates, sulphates, etc. Even toxic chemicals such as phenol and cyanides can be broken down this way. However, where the dissolved oxygen in the water is used up, the bio-chemical decomposition will change from aerobic to anerobic conditions, the water will darken in color and become septic and will produce an odor. In this condition the body of water is termed "polluted."

To reduce the Bio-chemical Oxygen Demand on a stream or river it is necessary to employ means for treating the contaminated water. In general, these waste treatment processes employ devices in which bio-chemical action quite similar to that which occurs in a stream or river is maintained. Such bio-chemical processes are particularly useful for waste treatment because they are effective with very dilute concentrations, which are too dilute for usual chemical and physical separation processes. Furthermore, unlike the latter, they are not selective in that they will remove all sorts of organic wastes at the same time.

The principal objective of waste treatment is the reduction of the oxygen demand of the waste, either by satisfaction or by removal. Contacting the waste with air will provide the oxygen required for this purpose. In such a process, some of the oxygen demand will be supplied by direct oxidation and, since conditions usually exist for bacteria to grow, for example, the presence of air and nutrients, the bacteria will reduce some of the waste material to carbon dioxide, water, nitrates and other materials.

When the waste is made to flow over a surface and a bacterial growth forms on this surface, the mechanism of oxygen transfer can be visualized as a diffusion of oxygen through bulk in flow to the liquid-air surface, a diffusion of oxygen through the liquid and a reaction of the oxygen with the bacteria.

The diffusional processes are dependent upon the gradient of concentration and upon the co-efficient of diffusion of one material through the other. The gradient of concentration for the oxygen in the air which contacts the liquid waste is established by the absorption of oxygen at the liquid-gas interface. The gradient for oxygen diffusion through the liquid is established by the bacteria or by the waste material, each of which can absorb oxygen.

One of the most widely used devices employed in the biological treatment of wastes is a device known as a "trickle filter." A conventional trickle filter is generally an aerated bed of crushed stone or other suitable fill material over which the waste water is distributed. The action of waste purifications as previously stated occurs through micro-organisms or bacterial colonies which adhere to the rock or packing surface and convert the polluting elements, either suspended as colloidal particles or in solution, into settable solids.

The basic process involves the concentration of the polluting material in the form of a slime which is attached to the packing and the periodic breaking off of agglomerations of the slime into the flowing stream and subsequently settling out outside the trickle filter. The capacity of the filter is effected by the balance between leaving enough growing bacteria on the packing surface for effective bio-chemical action and removing the excess growth fast enough to prevent clogging.

In forming the settable solids the micro-organisms consume the waste in the presence of oxygen from the air and the B.O.D. in the effluent is reduced. These solids are then removed in settling tanks and disposed of by incineration or employed as fertilizers or for other purposes. The supernatent liquid is returned to natural water systems such as rivers and lakes for re-use.

Among other things the bacterial activity is proportional to the amount of surface in the filter and the degree of filter aeration. Accordingly, a trickle filter packing, preferably, should have a high surface area per unit volume and adequate free space so that transfer of oxygen from air to water can be accomplished efficiently in a compact packing. Further it must provide constant mixing of the liquid stream to promote uniform liquid oxygenation and should promote gaseous diffusion of oxygen to the absorbing liquid surfaces. In addition, to minimize construction costs, it is preferable to use a light weight material, which can be made inexpensively and which is resistant to bacterial attack.

Also, it is preferable that the packing provide good liquid drainage, good aeration, formation of active bacteria colonies, sufficient surface of suitable roughness, and the packing should be arranged to provide for easy and uniform distribution of air and waste and must be of sufficient depth to accomplish the desired B.O.D. reduction. To avoid clogging which occurs when voids between packing elements are filled with biological growth, the packing geometry is preferably a compromise between undesirable clogging tendencies in packing with little free space and a desirable maximum surface area in packings having close spacing.

A suitable packing for a trickle filter is the cellular type packing herebefore described. The arrangement of the cellular structures in staggered layers, as heretofore described, will promote liquid mixing, turbulence, and enhance oxygenation. The interruption of air flowing through the packing at each leading edge will also promote high oxygenation rates and high filter efficiency. Such packing will provide a high surface area per unit volume so that the transfer of oxygen from the air to the water acn be accomplished efficiently in a compact packing.

The cellular structured packing of the present invention provides good liquid drainage, is suitable for formation of active bacteria colonies, and layers of the packing may be arranged, as required, to provide sufficient depth to accomplish the desired B.O.D. reduction.

FIGURE 17 illustrates schematically the use of the packing of the present invention in a trickle filter. The trickle is shown as comprising a casing 120 having arranged therein a plurality of staggered layers of cellular structured material 122 as constructed and arranged according to the present invention. Waste liquid supplied by an inlet conduit 124 is distributed at the top of the packing 122 and trickles therethrough to fall in a collecting basin 126 underlying the packing.

As previously set forth, the aerated liquid collected in the collecting basin 126 will contain settable solids which may be removed in settling tanks (not shown) supplied through the aerated liquid outlet line 128. The liquid may be distributed at the top of the packing 122 by any suitable means such as the illustrated, rotating distributor 130, or alternatively by spray nozzles, fixed perforated pipes, and other devices.

As the water trickles through the packing 122, air is allowed or forced to flow through the packing by a fan 134 suitably mounted thereabove. The fan 134 discharges the air from the casing 120 as shown in FIGURE 17. If desired, the fan 134 may also be arranged to discharge air down through the packing to be discharged through the louvered openings 132 to thereby provide co-current flow of the liquid and air rather than counter-current flow as in the case of the illustrated embodiment. Also, if desired, the fan may be dispensed with and natural air circulation utilized.

The surfaces of the packing may be provided with small irregularities or a small degree of roughness so that the surfaces of the packing will act as good anchorage for the bacteria.

The packing may be made from a light weight and low cost material such as kraft, or other type paper, for example, and can be manufactured inexpensively such as for example, by utilizing a honeycomb geometry for the cells. It is to be noted in this regard, that honeycomb can be fabricated by machine which reduces its cost as compared to other types of cellular structures which have to be assembled manually.

However, since digestion of organic matter is taking place in the filter and since paper is an organic material, means must be provided to resist bacterial attack, such as fungus and rot, and to avoid digestion of the paper. Such means may comprise, for example, coating or impregnating the paper, such as standard kraft paper for example, with a suitable protector such as phenolic resin. Impregnation with 15% to 18% of phenolic resin for example, will provide resistance to bacteria and fungus attack.

The above description relating to specific applications of the packing of the present invention is not inclusive since those skilled in the art who become aware of the principles of operation of the packing of the present invention will be able to utilize the packing in other mass transfer applications.

The packing of the present invention may be made out of various materials depending on the application. It may be made out of paper, for example, as previously mentioned or in applications where paper is not satisfactory, as in the case of various types of process apparatus in chemical industries, it may be made of phenolic resin impregnated nylon web or cloth, ceramic casting, or resin impregnated battery separator paper. An advantage of nylon web or cloth is that it is not flammable while an advantage of cast ceramic is that it will be better able to resist certain chemicals or adverse temperature conditions such as in chemical process application.

When using packing made of paper, the paper may be made non-flammable. Also, the packing may be hydrophobic or non-absorbent to promote droplet formation or it may be made hydrophilic or absorbent to promote film flow of a liquid.

When the packing is made in the form of honeycomb, it can be compressed at will to any equivalent hydraulic diameter thus increasing its versatility in meeting various application requirements. The honeycomb may be prepared and cured at one configuration and any under expansion can be further changed by the proper amount of compression. For example, in order to obtain a layer of packing of approximately ¼ inch hydraulic diameter to fit a 19.5 inch x 19.5 inch humidifier cell, ⅜ inch cell paper honeycomb can be cut into a rectangle 31 inches x 17.6 inches and compressed to 19.5 inches x 19.5 inches. In such a case the honeycomb is compressed in one direction only. Thus the 31 inch dimension reduces to 19.5 inches and the 17.6 dimension increases to 19.5 inches. The ratio of hydraulic diameters before and after compression is equal to the ratio of areas before and after compression. Thus, the resultant hydraulic diameter for the compressed section is 0.26 inch.

The packing of the present invention utilizes a combination of several principles in a novel way: air is kept in laminar flow as much as possible, with form drag reduced to a minimum since the latter is much less efficient in promoting heat transfer than frictional drag, short passages interrupt flow boundary layer formation which permits taking advantage of heat and mass transfer rates in entrance regions of ducts, and layer to layer contact promotes water liquid drainage since each layer provides run-off surfaces for the passages in the upper layers.

By using the honeycomb structure, the layers of packing lend themselves to cheap mass production techniques and one which has been used with a large number of different materials.

It is to be noted that the packing in FIGURES 12 to 17 is shown schematically and that in actual practice the cells of the packing would be much smaller in proportion to the vessel or container than that shown in these drawings. Also, since these drawings are schematic, the arrangements of the systems for distributing liquids over the packing mary vary in actual practice. For example, in FIGURE 16 there may be many more perforations in the distributing pipe than that actually shown therein.

The invention hereinabove described may be varied in construction within the scope of the claim, for the particular devices selected to illustrate the invention are but several of many possible embodiments of the same. The invention, therefore, is not to be restricted to the precise details of the structure shown and described.

What is claimed is:

Packing for use in mass or heat transfer apparatus of the type wherein at least two fluids are brought into contact with one another as they pass through the packing to effect a change in at least one of the fluids: said packing comprising a series of separate cellular structures arranged in layers, one against another; each cellular structure being a unitary construction formed of elongated sinuous sheet material strips, adjacent strips having regularly and uniformly spaced face areas thereof bonded together; the bonded face areas in adjacent strip pairs being parallel but staggered on opposite sides of imaginary lines running normal to the general directions taken by the bonded face areas of the strips, the strips having their unbonded face areas acutely angled from their bonded face areas whereby the strips form parallel hexagonal passages of constant cross section throughout their full axial lengths; the cellular structure layers being laid one against another with the parallel hexagonal passages running normal to the general layer planes; adjacent layers having all of the bonded and unbonded face areas of their strips out of direct planar alignment with one another whereby all of the strip edges in each layer are exposed to the fluids passing through the packing.

References Cited by the Examiner

UNITED STATES PATENTS

| | | | |
|---|---|---|---|
| 1,287,402 | 12/1918 | Nordberg. | |
| 2,183,657 | 12/1939 | Page | 210—150 XR |
| 2,306,192 | 12/1942 | Spiselman et al. | |
| 2,356,653 | 8/1944 | Cox | 261—111 |
| 2,695,773 | 11/1954 | McGrath. | |
| 2,739,118 | 3/1956 | Carey | 210—150 XR |
| 2,793,017 | 5/1957 | Lake | 261—112 |
| 2,809,148 | 10/1957 | Bernhauer et al. | |
| 2,825,541 | 3/1958 | Moll et al. | 210—150 XR |
| 2,838,135 | 6/1958 | Pilo et al. | 261—151 |
| 2,893,988 | 7/1959 | Bernhauer et al. | |
| 2,917,292 | 12/1959 | Hittrich | 261—112 |
| 2,951,017 | 8/1960 | Speedie. | |
| 2,986,379 | 5/1961 | Kramig | 261—112 |
| 3,039,749 | 6/1962 | Kohl | 261—112 |
| 3,041,181 | 6/1962 | Simonin et al. | 195—142 |
| 3,044,237 | 7/1962 | Mart. | |
| 3,084,918 | 4/1963 | Kohl | 261—112 |
| 3,112,261 | 11/1963 | Porter et al. | 210—150 XR |

HARRY B. THORNTON, *Primary Examiner.*